(12) United States Patent
Takahata et al.

(10) Patent No.: US 8,264,571 B2
(45) Date of Patent: Sep. 11, 2012

(54) IMAGE CAPTURE DEVICE AND IMAGE PROCESSING DEVICE

(75) Inventors: Junji Takahata, Osaka (JP); Akira Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 841 days.

(21) Appl. No.: 12/018,867

(22) Filed: Jan. 24, 2008

(65) Prior Publication Data

US 2008/0266421 A1    Oct. 30, 2008

(30) Foreign Application Priority Data

Jan. 26, 2007    (JP) .................. 2007-016014

(51) Int. Cl.
H04N 5/76    (2006.01)

(52) U.S. Cl. ................ 348/231.5; 348/231.2; 348/231.3
(58) Field of Classification Search ............... 348/231.5
See application file for complete search history.

(56) References Cited

U.S. PATENT DOCUMENTS

2004/0075752 A1* 4/2004 Valleriano et al. ......... 348/231.3
2006/0114336 A1* 6/2006 Liu ............................ 348/231.3
2010/0171846 A1* 7/2010 Wood et al. ............... 348/231.99

FOREIGN PATENT DOCUMENTS

| JP | 2001-008143 | 1/2001 |
|---|---|---|
| JP | 2003-111013 | 4/2003 |
| JP | 2003-134454 | 5/2003 |
| JP | 2006-162367 | 6/2006 |

OTHER PUBLICATIONS

Panasonic, "Operating Instructions for Digital Camera Model No. DMC-FZ7", Jan. 23, 2006, pp. 9, 10, 19, 35, 66, 67, 120.*
Operating Instructions of Panasonic Digital Camera, Model No. DMC-FZ7, pp. 66-67 with Press Release date of Jan. 23, 2006.
Notice of Reasons for Rejection for corresponding Japanese Application No. 2008-000666 dated Nov. 29, 2011 and English translation.
Notice of Reasons for Rejection for corresponding Japanese Application No. 2008-000666 dated Mar. 6, 2012 and English translation.

* cited by examiner

*Primary Examiner* — Anthony J Daniels
(74) *Attorney, Agent, or Firm* — Renner, Otto, Boisselle & Sklar, LLP

(57) ABSTRACT

An image capture device includes: an imager for imaging an object and generating image data; an image file generator for generating an image file by adding, to the image data generated by the imager, a header portion which stores at least one type of information concerning shooting circumstances; a timer for outputting information indicating a current time; and a manipulation section which is used to set period information specifying a period. The image file generator changes the type of information to be stored in the header portion depending on whether a time of imaging as indicated by the information which is output from the timer at the time of the imaging falls within the period specified by the period information.

4 Claims, 11 Drawing Sheets

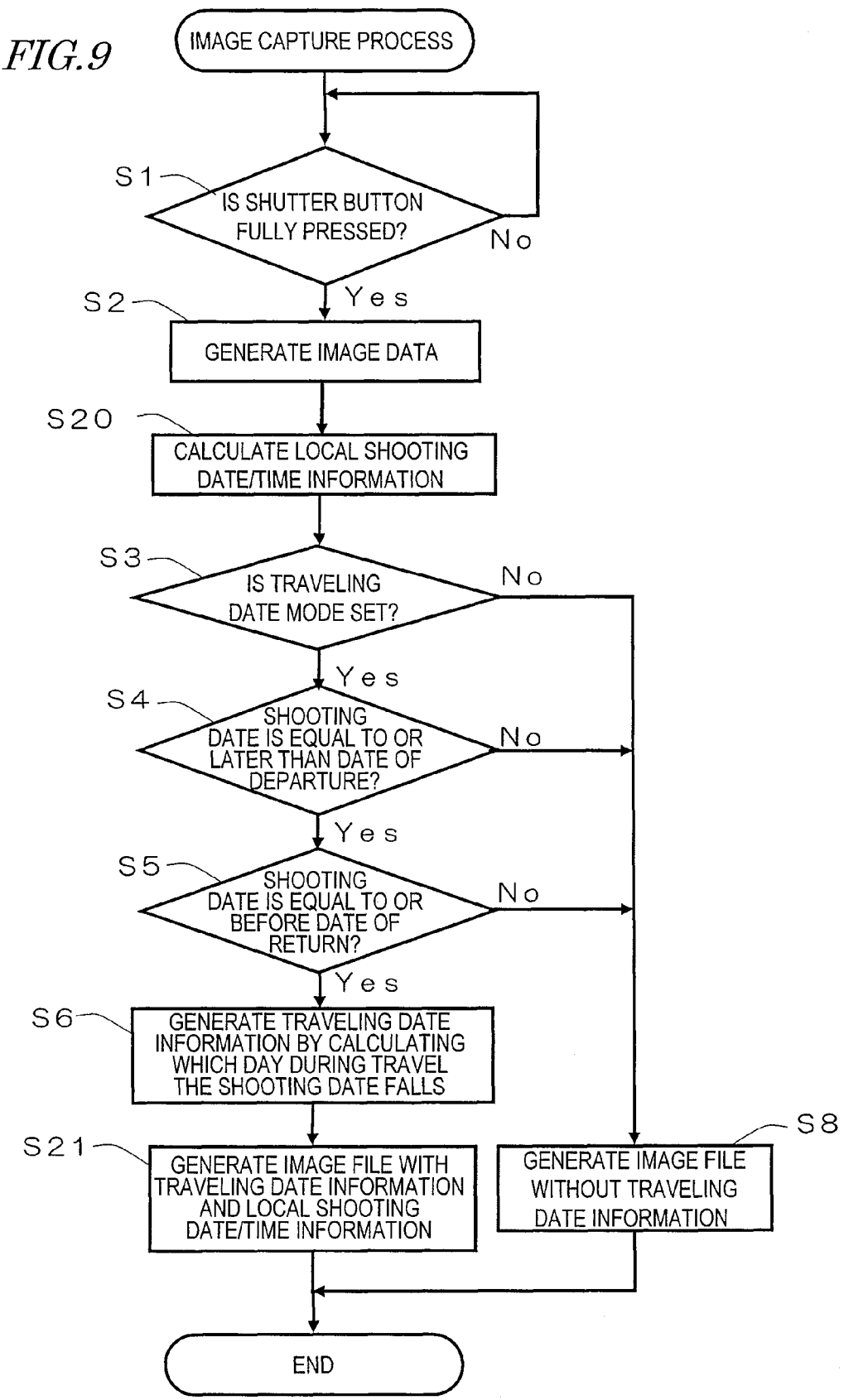

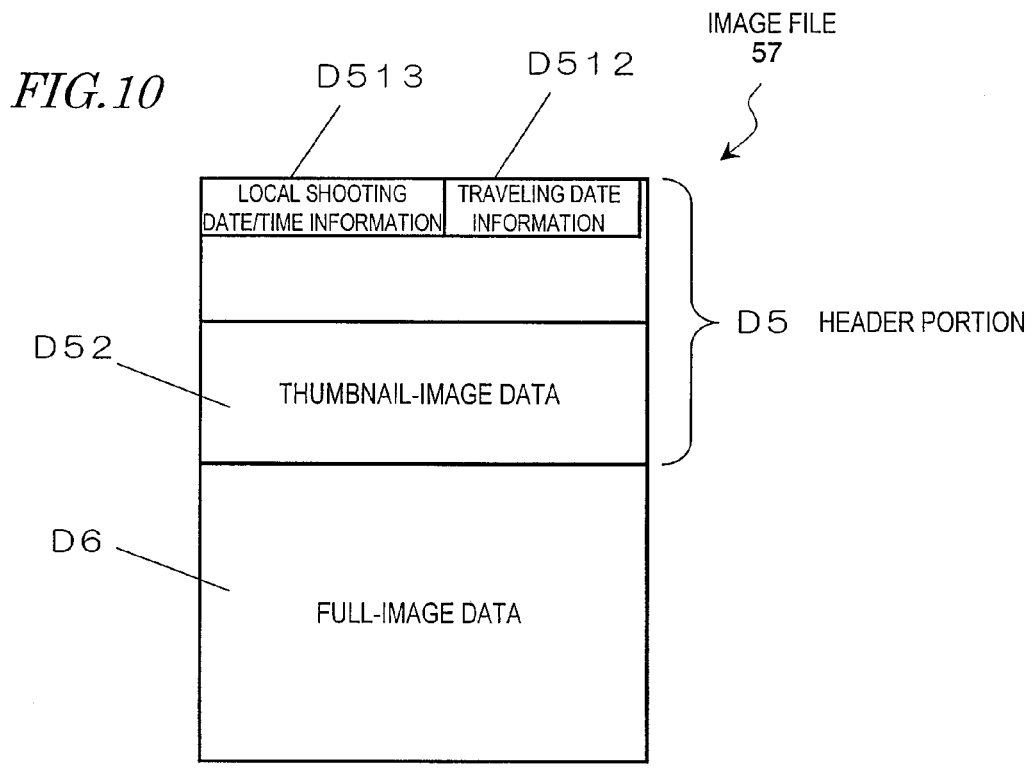
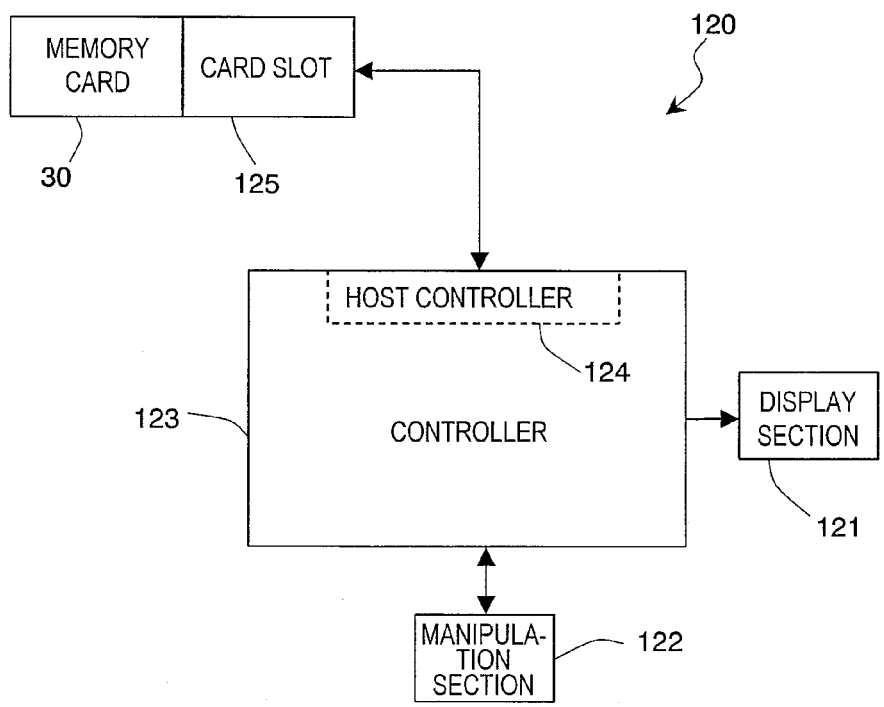

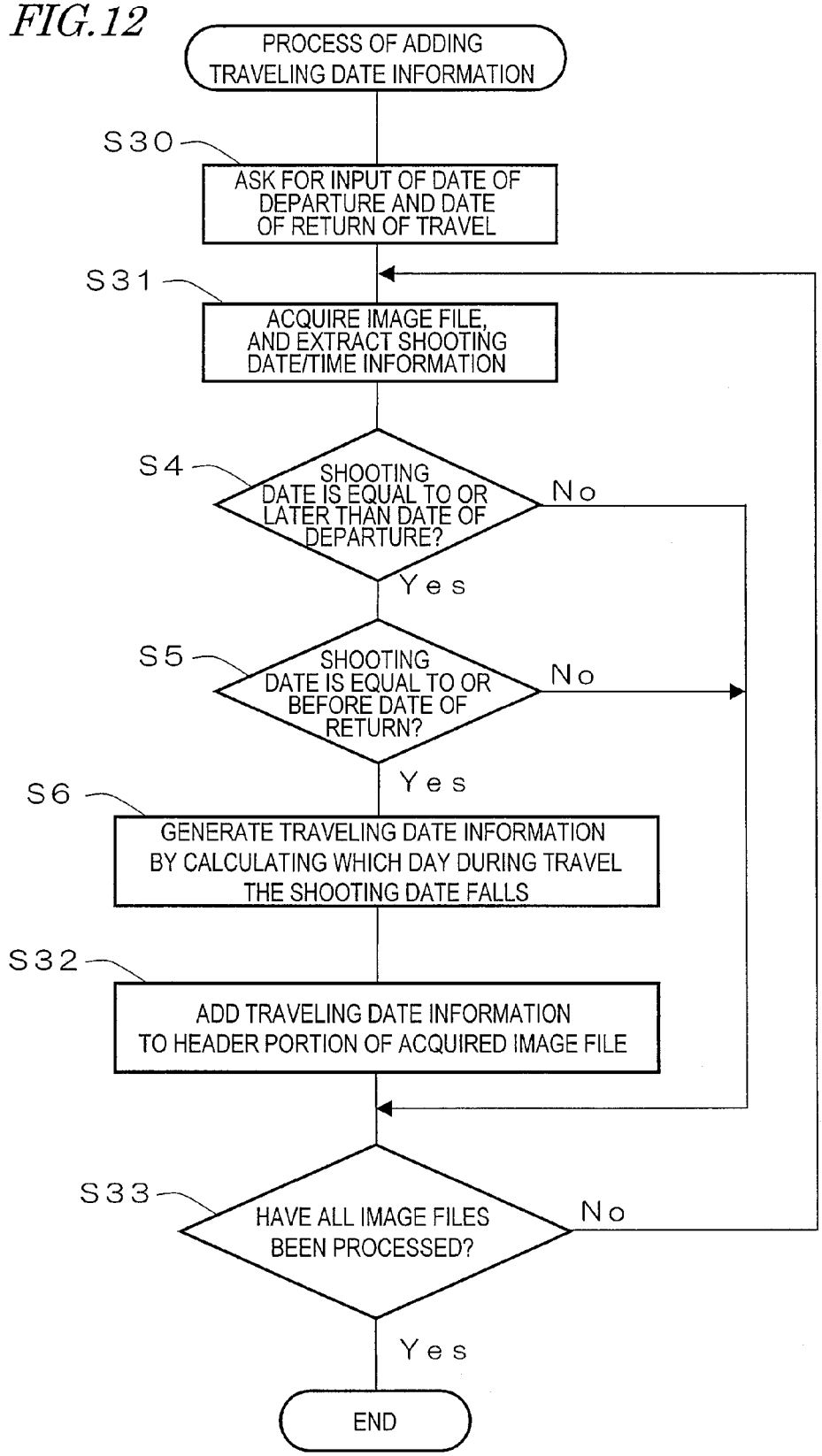

IMAGE CAPTURE DEVICE AND IMAGE PROCESSING DEVICE

BACKGROUND OF THE INVENTION

1. Field of the Invention

The present invention relates to an image capture device for capturing an image of an object and generating an image file; a computer program to be executed by the image capture device, and a storage medium having the program stored therein; an image processing device for adding header information to the image file; and an image processing device for playing back an image from the image file.

2. Description of the Related Art

In recent years, as memory cards increase in capacity, the number of images which can be generated and stored in a memory card by a digital camera is increasing. This has led to a desire for a digital camera which allows images to be classified as appropriate.

Japanese Laid-Open Patent Publication No. 2003-discloses an image capture device which stores additional information (e.g., position information, time information, shooter information, or image information) to a header portion of an image file. This image capture device classifies imaged data into groups based on position information, and adds grouping information to the header portions. As a result, grouping of the imaged data based on position information can be automatically performed. The user's trouble of keeping contents under management is reduced, and the working efficiency can be improved.

In a conventional image capture device, it is necessary to previously set the type of information to be stored in the header portion (position information, time information, etc.). Once a type is set, the same type of information will be universally stored in the header portion of every image file, until it is changed at a later time.

In some cases, a user may wish to change the type of information to be stored in the header portion depending on the situation of use. In such cases, if the user must select a type of information every time the situation of use changes, it would be cumbersome to the user. In displaying or printing images, too, it would be cumbersome if the user must select a type of information for each image.

SUMMARY OF THE INVENTION

An objective of the present invention is to provide an image capture device which can appropriately change the type of information to be stored in a header portion of an image file, based on a setting which is made in advance through a simple manipulation; and an image processing device which is capable of performing an output while appropriately changing the type of information.

An image capture device according to the present invention comprises: an imager for imaging an object and generating image data; an image file generator for generating an image file by adding, to the image data generated by the imager, a header portion which stores at least one type of information concerning shooting circumstances; a timer for outputting information indicating a current time; and a manipulation section which is used to set period information specifying a period, wherein, the image file generator changes the type of information to be stored in the header portion depending on whether a time of imaging as indicated by the information which is output from the timer at the time of the imaging falls within the period specified by the period information.

In a preferred embodiment, information indicating a start time of the period is set as the period information; and the image file generator is operable to, if the time of imaging is before the start time specified by the period information, store in the header portion first time information indicating a point in time at which the object is imaged, and if the time of imaging is equal to or later than the start time specified by the period information, store in the header portion the first time information and second time information indicating an elapsed time from the start time to the time of imaging.

In a preferred embodiment, information specifying an end time of the period is further set as the period information; and the image file generator is operable to, if the time of imaging is after the end time specified by the period information, store the first time information to the header portion and not store the second time information to the header portion.

In a preferred embodiment, the timer outputs information of a current time of a first location; the manipulation section is used to set a time difference information specifying a time difference between the first location and a second location; and based on the information which is output from the timer at the time of the imaging and the time difference information, the image file generator calculates third time information indicating a point in time of the second location at the time of the imaging, and stores the third time information to the header portion as the first time information.

In a preferred embodiment, if the point in time of the second location as indicated by the third time information is equal to or later than the start time specified by the period information, the image file generator stores the third time information to the header portion as the first time information, and stores fourth time information to the header portion as the second time information, the fourth time information indicating an elapsed time from the start time to the point in time of the second location as indicated by the third time information.

An image processing device according to the present invention comprises: an image acquisition section for acquiring an image file containing image data and time information, the time information specifying a point in time at which the image data is generated; an image file generator for generating an image file by adding, to the image data acquired by the image acquisition section, a header portion which stores at least one type of information concerning shooting circumstances; and a manipulation section which is used to set period information specifying a period, wherein, the image file generator changes the type of information to be stored in the header portion depending on whether the point in time at which the image data is generated, as specified by the time information, falls within the period which has been set with the manipulation section.

Alternatively, an image processing device according to the present invention comprises: an image acquisition section for acquiring an image file containing image data and time information, the time information specifying a point in time at which the image data is generated; a processing section for performing a process for outputting an image based on the image data; an output section for outputting the image; and a manipulation section which is used to set period information specifying a period, wherein, the image processing device changes the type of information to be output from the output section together with the image depending on whether the point in time at which the image data is generated, as specified by the time information, falls within the period which has been set with the manipulation section.

According to another aspect of the present invention, there is provided a storage medium having a computer program recorded thereon to be executed by an image capture device, the image capture device including: an imager for imaging an object and generating image data; an image file generator for generating an image file based on the image data generated by the imager; a timer for outputting information indicating a current time; and a manipulation section which is used to set period information specifying a period, wherein, the computer program causes the image file generator to execute: a process of determining whether a time of imaging as indicated by the information which is output from the timer at the time of the imaging falls within the period specified by the period information; a process of generating a header portion which stores at least one type of information concerning shooting circumstances, where the type of information to be stored is changed depending on a result of the determination; and a process of generating an image file by adding the header portion to the image data.

According to still another aspect of the present invention, there is provided a storage medium having a computer program recorded thereon to be executed by an image processing device, the image processing device including: an image acquisition section for acquiring an image file containing image data and time information, the time information specifying a point in time at which the image data is generated; an image file generator for generating an image file based on the image data acquired by the image acquisition section; and a manipulation section which is used to set period information specifying a period, wherein, the computer program causes the image file generator to execute: a process of determining whether the point in time at which the image data is generated, as specified by the time information, falls within the period which has been set with the manipulation section; a process of generating a header portion which stores at least one type of information concerning shooting circumstances, where the type of information to be stored is changed depending on a result of the determination; and a process of generating an image file by adding the header portion to the image data.

According to still another aspect of the present invention, there is provided a storage medium having a computer program recorded thereon to be executed by an image processing device, the image processing device including: an image acquisition section for acquiring an image file containing image data and time information, the time information specifying a point in time at which the image data is generated; a processor for performing a process for outputting an image based on the image data; an output section for outputting the image; and a manipulation section which is used to set period information specifying a period, wherein, the computer causes the processor to execute: a process of determining whether the point in time at which the image data is generated, as specified by the time information, falls within the period which has been set with the manipulation section; and a process of changing, depending on a result of the determination, the type of information to be output from the output section together with the image.

According to the present invention, by setting period information to the image capture device, the type of information to be stored in a header portion of an image file is appropriately changed depending on whether a time of imaging falls within a period which is specified by period information.

For example, if the user sets a traveling period to a camera as the period information, depending on whether an image file which contains an image shot before or after a travel or which contains an image shot during the traveling period, different types of information will be stored in their header portions. As a result, it becomes possible to easily make an ex post facto determination as to whether the image was shot during the traveling period.

In many cases, the period of a travel is known in advance, and therefore it would be possible for the user to set a traveling period in advance. Even if a traveling period is set several weeks in advance, different types of information will be automatically stored in the header portion of each image file depending on whether it is taken during the traveling period or not. Therefore, the user does not need to change the settings of the camera while being aware of whether it is during his/her travel or not. Since the user does not need to hastily change the settings immediately before or in the middle of the travel, the user's burden of manipulation is reduced.

For example, if the time of imaging does not fall within the period which is specified by the period information, information indicating a point in time at which the object was imaged is stored in the header portion. On the other hand, if the time of imaging falls within the period which is specified by the period information, not only information indicating the point in time at which the object was imaged, but also information indicating an elapsed time from the start time of the period to the time of imaging is stored. The user can easily determine which day during the travel the image was shot.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 9 is a flowchart showing the procedure of an imaging process by the camera 100 according to Embodiment 2.

FIG. 10 is a schematic diagram of a data structure of an image file 57 which contains traveling date information D512 and local shooting date/time information D513.

FIG. 11 is a diagram showing the internal hardware construction of a PC 120.

FIG. 12 is a flowchart showing the procedure of a process by the PC 120 according to Embodiment 3.

DETAILED DESCRIPTION OF PREFERRED EMBODIMENTS

Hereinafter, with reference to the accompanying figures, embodiments of the image capture device and the image processing device according to the present invention will be described.

In Embodiments 1 and 2 below, image capture devices which capture image of an object and generate an image file will be described. In Embodiment 3, an image processing device which adds newly-generated information to a header portion of an existing image file will be described. In Embodiment 4, an image processing device which displays an image or prints an image from an existing image file will be described.

1. Embodiment 1

1-1. Outline of an Operation of an Image Capture Device (Digital Still Camera) of the Present Embodiment An image capture device of the present embodiment is a digital still camera. The digital still camera has an operation mode for adding information to an image that has been shot, the information indicating which day during a travel the image was shot. When setting this operation mode, via manipulation keys, the digital still camera receives information specifying the period of a travel from the user. The period of a travel is to be specified by a date of departure and a date of return, or by a date of departure alone.

If an image is taken during a traveling period for the sake of which the operation mode was set, the digital still camera stores traveling date information to a header portion of an image file to be generated. Traveling date information is a piece of information indicating which day the date of shooting falls on, as counted from the date of departure of the travel. When the image file having the traveling date information is played back, the digital still camera displays the traveling date information so as to be superposed on the played-back image.

Figure 1:
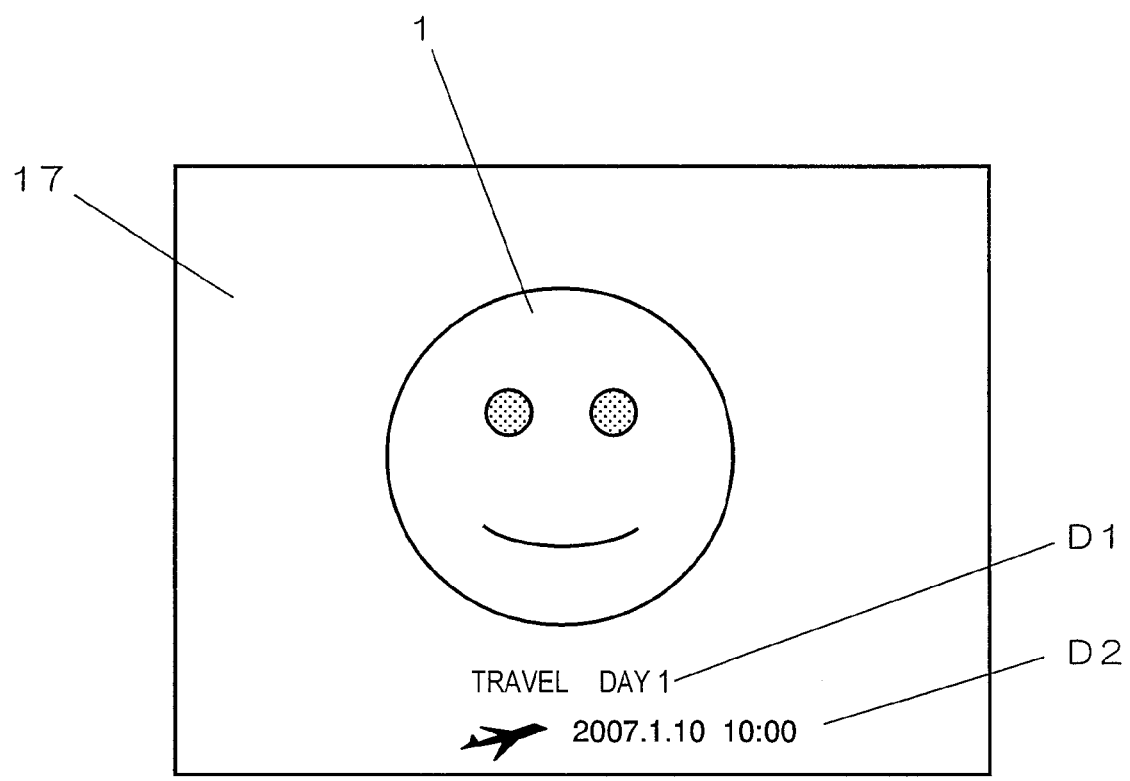
FIG. 1 is a schematic diagram showing a display 17 of a digital still camera, on which traveling date information is being displayed.

FIG. 1 is a schematic diagram showing a display 17 of a digital still camera on which traveling date information is being displayed. On the display 17, a traveling date D1 is being displayed so as to be superposed on an image 1 that has been shot. The display 17 also displays a time of shooting D2 indicating the date and time of shooting.

1-2. Exterior Appearance/Construction of the Digital Still Camera

Figure 2:
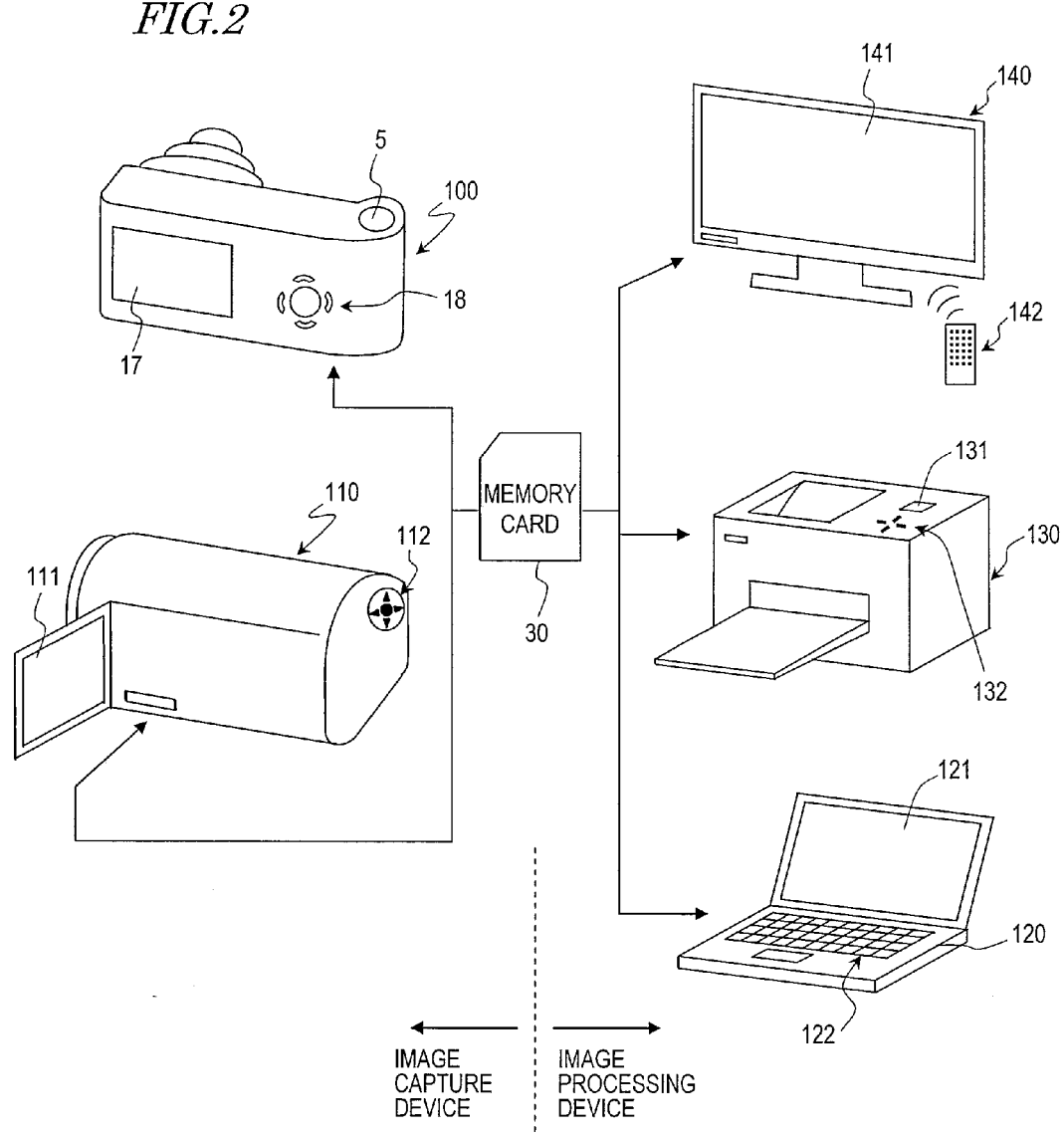
FIG. 2 is a diagram showing the exterior appearances of various devices, including a digital still camera 100.

FIG. 2 shows the exterior appearance of a digital still camera 100 according to the present embodiment.

The digital still camera 100 includes a shutter button 5, a display 17, and a manipulation section 18. Assuming that the user has set a traveling period via the manipulation section 18, when a shooting is performed by pressing the shutter button 5 during the traveling period, the digital still camera 100 calculates which day from the date of departure of the travel the shooting date falls on, and writes an image file to a memory card 30, such that the header portion of the image file stores traveling date information.

FIG. 2 also shows a digital camcorder 110 as another example of an image capture device according to the present embodiment. The digital camcorder 110 includes a display 111 and manipulation keys 112, which correspond to the display 17 and the manipulation section 18 of the digital still camera 100. The digital camcorder 110 is also capable of generating an image file having traveling date information stored therein. In the case where the moving pictures are of the motion JPEG format, each of the frames composing the moving pictures is a discrete still picture. Therefore, the digital camcorder 110 may calculate which day from the travel date of departure the shooting date of the beginning frame falls on, and write an image file to a memory card 30 such that the header portion of the image file stores traveling date information.

FIG. 2 also shows a PC 120, a printer 130, and a TV 140, which correspond to image processing devices according to Embodiments 3 and 4. Their constructions and operations will be specifically described later.

1-3. Detailed Internal Structure of the Digital Still Camera

Next, the internal structure and operation of the digital still camera 100 will be specifically described. Hereinafter, the digital still camera 100 will be simply referred to as the "camera 100".

Figure 3:
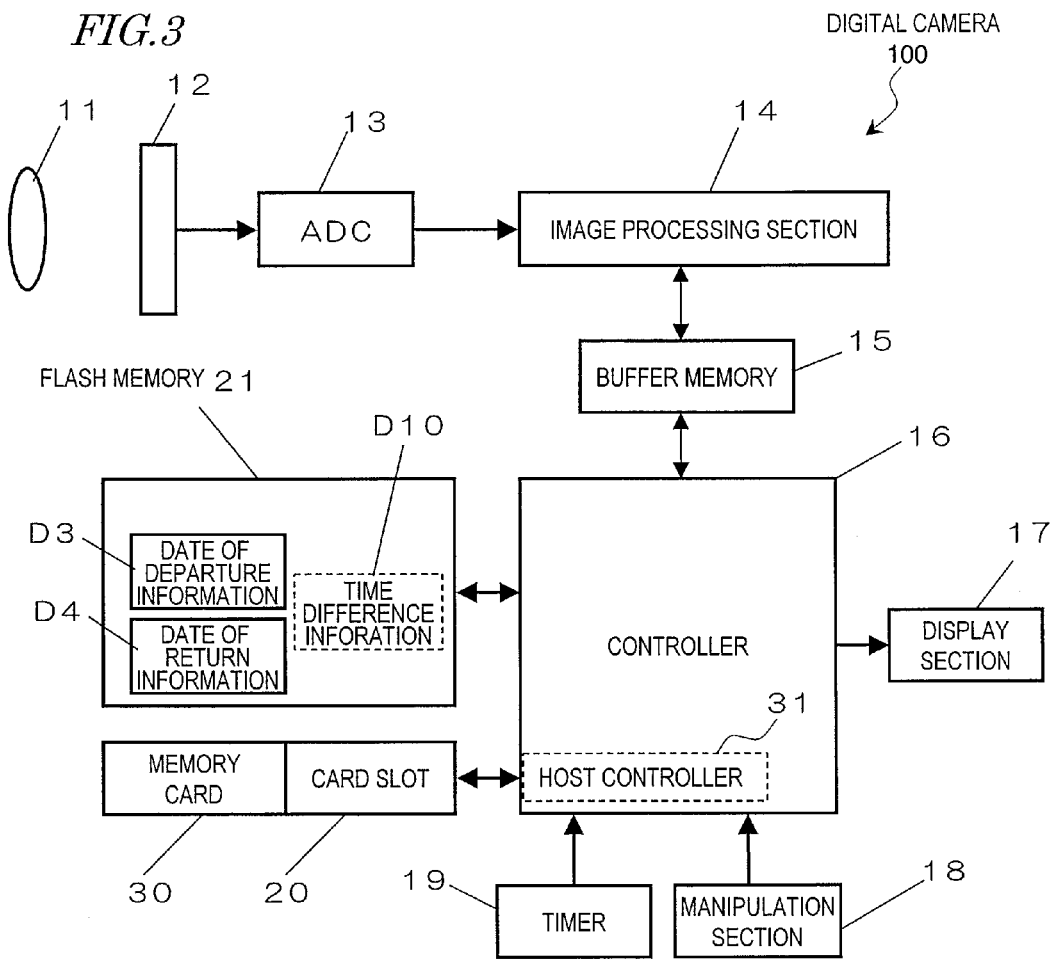
FIG. 3 is a diagram showing the internal hardware construction of the camera 100.

FIG. 3 shows the internal hardware construction of the camera 100. The camera 100 includes an optical system 11, an imaging device 12, an AD converter 13, an image processor 14, a buffer memory 15, a controller 16, the display 17, the manipulation section 18, a timer 19, a card slot 20, and a flash memory 21.

FIG. 3 illustrates a memory card 30 only for convenience of description. It must be noted that the memory card 30 is not an indispensable component element of the camera 100.

Hereinafter, the component elements of the camera 100 will be described.

The optical system 11 converges light from the surrounding environment, in which an object of shooting is situated, onto the imaging device 12. The imaging device 12 takes an image of the object, and generates an image signal. The AD converter 13 converts the image signal which has been generated in the imaging device 12 into image data of a digital format.

The image processor 14 performs various image processing for the digitized image data. The various image processing may include, for example, gamma correction, flaw correction, white balance correction, YC conversion process, electronic zoom process, compression process, expansion process, and the like. It is up to the product design as to what sorts of image processing the image processor 14 functions to perform. The image processor 14 may be implemented as a DSP or a microcomputer, for example. The image processor 14 may be integral with the controller 16.

Image data is generated by the imaging device 12, the AD converter 13, the image processor 14 described above.

The buffer memory 15 functions as a work memory for the image processor 14 and the controller 16. The buffer memory 15 may be a DRAM, for example.

The controller 16 controls the overall operation of the camera 100. The controller 16 is a microcomputer, for example. The controller 16 includes a host controller 31 for controlling the communications between the card slot 20 (described later) and the memory card 30. The host controller 31 may be implemented as part of the functions of the controller 16, but may be implemented as a piece of hardware (e.g., a chip circuit) separate from the controller 16.

The controller 16 generates an image file, and stores the image file to the memory card 30. The controller 16 also reads an image file that is stored in the memory card 30, and performs image processing for playing it back.

The display 17 displays image data which has been shot or image data which is stored in the memory card 30. The display 17 also displays various setting information concerning the camera 100. The display 17 is a liquid crystal monitor, an organic EL display, or the like, for example.

The manipulation section 18 is utilized by a user to give instructions to the camera 100, or to input setting information. The instructions and setting information which have been input via the manipulation section 18 are input to the controller 16. The manipulation section 18 can be composed of crosskeys, a joystick, press buttons, etc.

The timer 19 is a clock for keeping counts of the current time. The point in time is specified in terms of the year, month, date, hour, minute, and second, for example. The timer 19 outputs information indicating the current time to the controller 16. Even when the controller 16 and the like are not powered, the timer 19 is being operated by a backup power supply (not shown).

A detachable memory card 30 is inserted into the card slot 20. When the memory card 30 is inserted, communications between the memory card 30 and the controller 16 are performed via the card slot 20.

The flash memory 21 receives and stores date of departure information D3 and date of return information D4 from the controller 16. The flash memory 21 is a non-volatile memory, and is capable of retaining the date of departure information D3 and date of return information D4 even after supply of power to the camera 100 is stopped.

Figure 4:
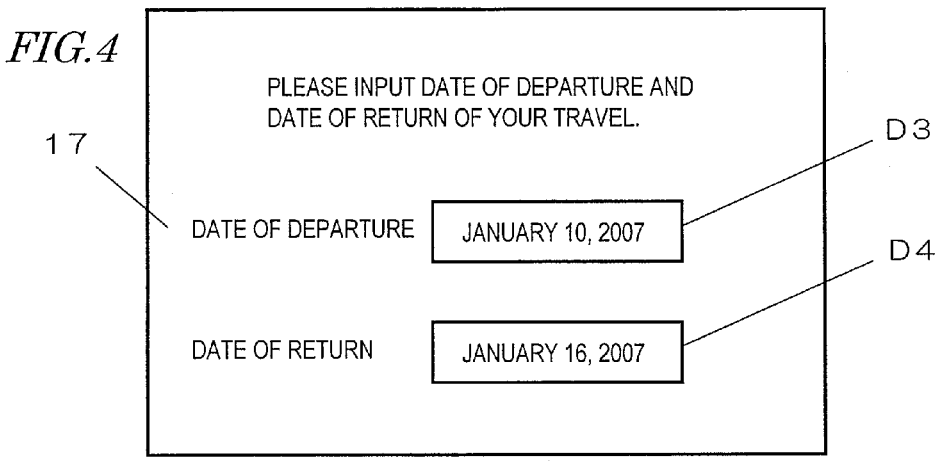
FIG. 4 is a diagram showing an exemplary image that is represented on the display 17 when date of departure information D3 and date of return information D4 are being set.

FIG. 4 shows an exemplary image date that is displayed on the display 17 when the departure information D3 and the date of return information D4 are being set. While confirming on the display 17 the substance of the date of departure information D3 and the date of return information D4 that are being input, the user is able to change, finalize, or cancel the substance of such information via the manipulation section 18.

Note that the screen shown in FIG. 4 may be called via a menu screen (not shown) of the camera 100, or a dedicated button for calling the screen may be provided. Although FIG. 3 illustrates time difference information D10 which is stored in the flash memory 21, the time difference information D10 will be described later with respect to Embodiment 2.

1-4. Operation of the Digital Still Camera

Next, processes by the camera 100 will be described. Main processes by the camera 100 of the present embodiment can be generally classified into an imaging process and a playback process. Hereinafter, the imaging process will be described with reference to FIGS. 5 and 6, and thereafter the playback process will be described with reference to FIG. 7.

1-4-1. Imaging Process

Figure 5:
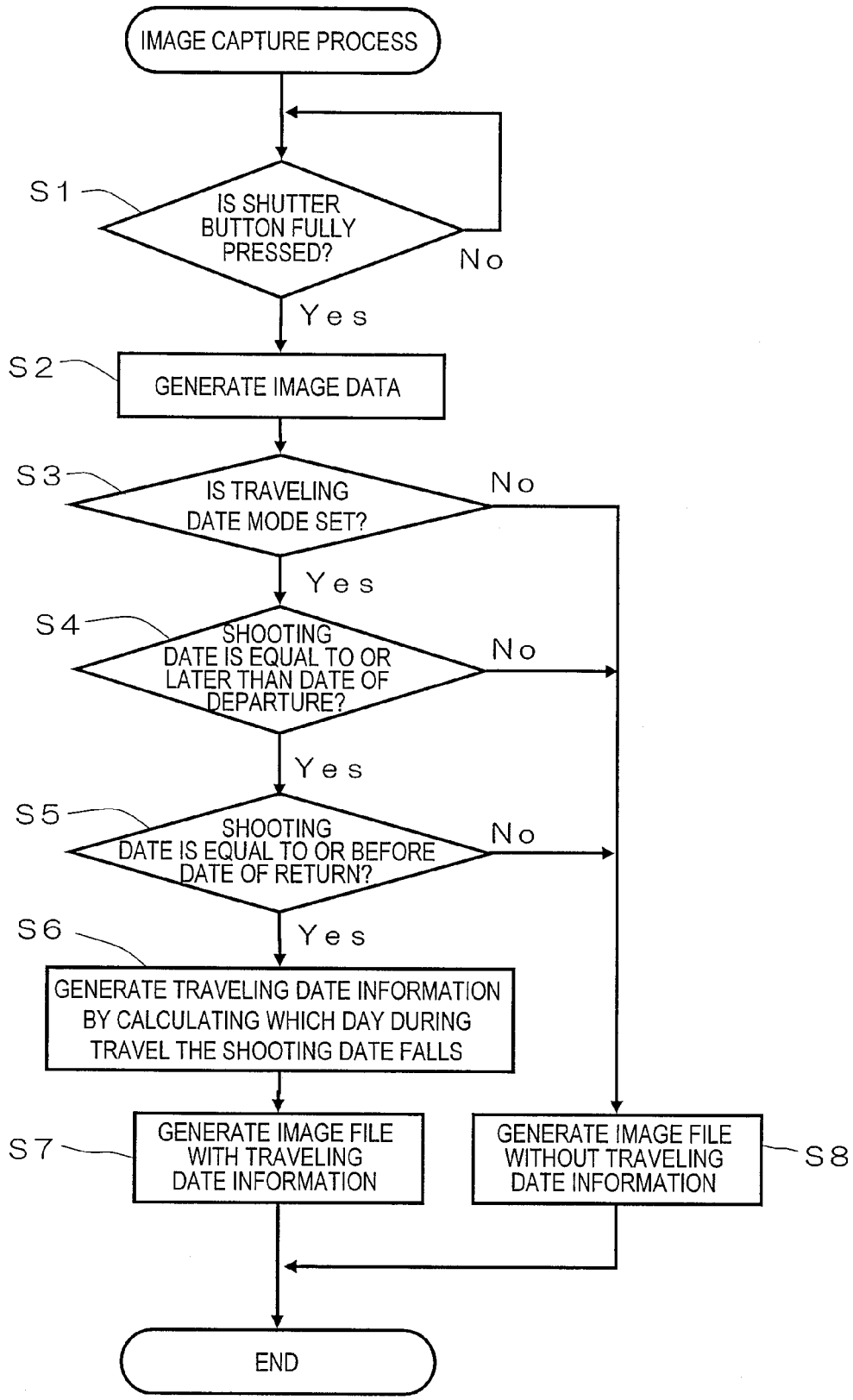
FIG. 5 is a flowchart showing the procedure of an imaging process by the camera 100 according to Embodiment 1.

FIG. 5 is a flowchart showing the procedure of an imaging process by the camera 100 of the present embodiment. This process is executed when the user uses the camera 100 on a travel or the like. In the present embodiment, it is assumed that no time difference exists between the region of departure and the traveled region.

In step S1, the controller 16 keeps monitoring until the shutter button in the manipulation section 18 is fully pressed. When the shutter button is fully pressed, the process proceeds to step S2.

In step S2, the imaging device 12 generates an analog image signal for recording, and the AD converter 13 digitizes this image signal. The image processor 14 subjects the resultant digital image data to various image processing. As a result, full-image data D6 and thumbnail-image data D52 to be stored in the image file are generated.

Next, in step S3, the controller 16 confirms whether the traveling date mode has been set or not. The traveling date mode can be set by the user in advance. If date of departure information D3 and date of return information D4 are stored in the flash memory 21, the controller 16 determines that the traveling date mode is set.

Note that the determination as to whether the traveling date mode is set or not can be sufficiently made by checking whether at least date of departure information D3 is set because in some cases the date of return of a travel might be unknown.

On the other hand, even if date of departure information D3 and date of return information D4 have already been input, if the current time as indicated by the timer 19 is later than the date of return which is indicated by the date of return information D4, the controller 16 assumes as if the traveling date mode were not set (see step S5 below). This ensures that the traveling date mode will not be asserted in vain with respect to the date of departure information D3 and date of return information D4 which were input in connection with a past travel. If the current time as indicated by the timer 19 is later than the date of return which is indicated by the date of return information D4, the controller 16 may destroy the date of departure information D3 and date of return information D4 off the flash memory 21.

If the traveling date mode is set, the process proceeds to step S4. On the other hand, if the traveling date mode is not set, the process proceeds to step S8.

In step S4, the controller 16 determines whether or not the shooting date is equal to or later than the date of departure. Specifically, the controller 16 reads the date of departure information D3 which is stored in the flash memory 21, and acquires information indicating the current time from the timer 19. Then, the controller 16 compares the respective dates indicated by the date of departure information D3 and the information indicating the current time. Note that the "current time" is assumed to be a point in time which the timer 19 indicates when the shutter button 5 of the camera 100 is pressed.

If the result of comparison indicates that the current time is equal to or later than the date of departure which is indicated by the date of departure information D3, the process proceeds to step S5. On the other hand, if the current time is before the date of departure, the controller 16 proceeds to step S8.

In step S5, the controller 16 determines whether or not the shooting date is equal to or before the date of return. Specifically, the controller 16 reads the date of return information D4 which is stored in the flash memory 21. Then, the controller 16 compares the date of return information D4 against the current time.

If the result of comparison indicates that the current time is equal to or before the date of return which is indicated by the date of return information D4, the process proceeds to step S6. On the other hand, if the current time is after the date of return, the process proceeds to step S8.

In step S6, based on the current time and the date of departure information D3, the controller 16 calculates which day during the travel is today (shooting date), and generates traveling date information D512. The traveling date information D512 indicates which day during the travel is today. For example, if the current time is "Jan. 10, 2007, 15:30", and the date of departure which is indicated by the date of departure information D3 is "Jan. 10, 2007", the traveling date information D512 should be a piece of information indicating "Day 1 of travel".

Next, in step S7, the controller 16 generates an image file containing the traveling date information D512.

Figure 6A:
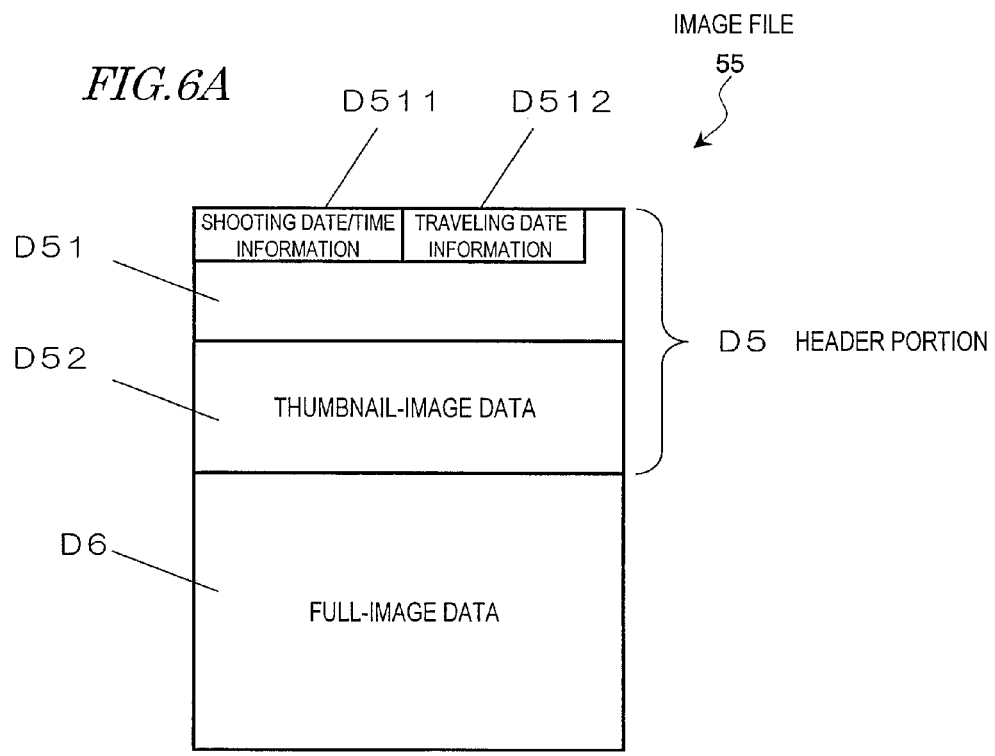
FIG. 6A is a schematic diagram of a data structure of an image file 55 which contains traveling date information D512.

FIG. 6A schematically shows the data structure of an image file 55 which contains traveling date information D512. The image file 55 is composed of full-image data D6 with a header portion D5 added thereto.

The header portion D5 includes an information storing portion D51 and thumbnail-image data D52. In the information storing portion D51 is stored various information concerning the shooting circumstances, e.g., the focal length, f number, and shutter speed.

In the present embodiment, at least the traveling date information D512 is stored in the information storing portion D51. Shooting date/time information D511 may also be stored in the information storing portion D51. The shooting date/time information D511 is a piece of information indicating the current time (i.e., the shooting date/time) acquired from the timer 19 in step S4.

The shooting date/time information D511 and the traveling date information D512 are different types of information, both of which concern the shooting circumstances.

Figure 6B:
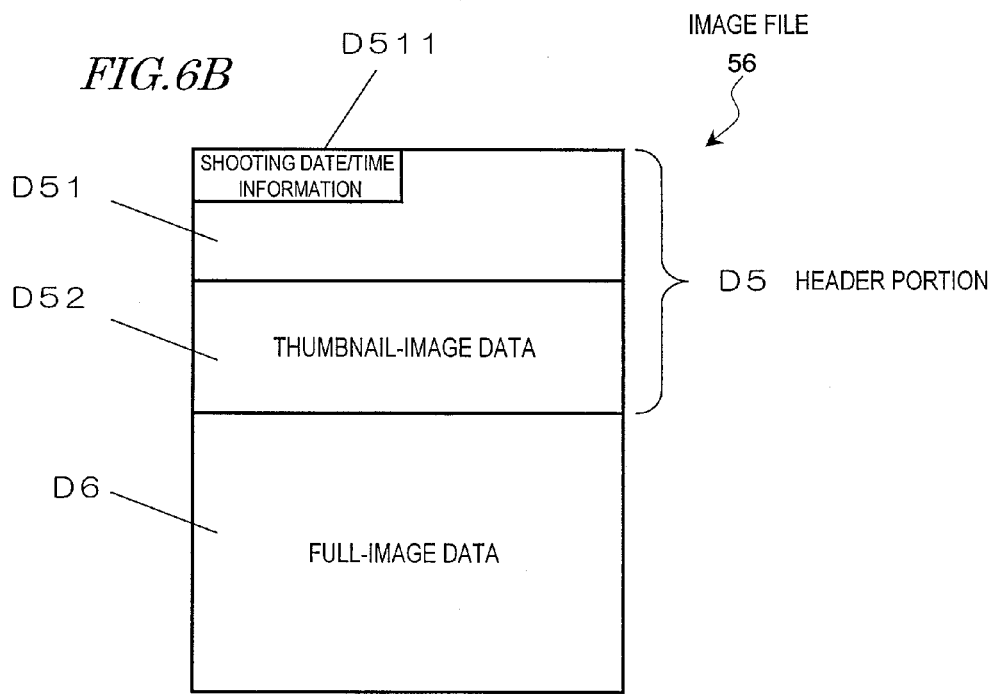
FIG. 6B is a schematic diagram of a data structure of an image file 56 which does not contain traveling date information D512.

On the other hand, in step S8 of FIG. 5, the controller 16 generates an image file which does not contain traveling date information D512. FIG. 6B schematically shows the data structure of an image file 56 which does not contain traveling date information D512. As compared to FIG. 6A, it will be clear that traveling date information D512 is not stored in the header portion D5 of FIG. 6B.

Herein, when it is said that "traveling date information D512 is not stored in the header portion D5", it is meant that no information that is meaningful as traveling date information D512 is stored in the header portion D5, without being limited to the example shown in FIG. 6B.

For example, the header portion D5 may not have any area for storing the traveling date information D512. Even if there is an area for storing traveling date information D512 in the header portion D5, it is considered that no traveling date information D512 is stored in the header portion D5 if information that is meaningless as traveling date information D512 is stored. Examples of "information that is meaningless as traveling date information D512" would be information indicating absence of the traveling date mode, or predetermined dummy information that does not convey any meaning.

As described above, by previously setting the date of departure information D3 for a travel, it becomes possible to automatically switch, once the travel begins, to a mode where traveling date information D512 is stored in the header portion D5. Moreover, by previously setting the date of return information D4 for the travel, it becomes possible to automatically switch, after the end of the travel, to a mode where traveling date information D512 is not stored in the header portion D5.

Based on whether the date of departure information D3 and the date of return information D4 is set or not (step S3 of FIG. 5), the camera 100 of the present embodiment determines whether the traveling date mode is set or not, and if the traveling date mode is not set, generates an image file which does not contain traveling date information. Therefore, even during a traveling period, if the traveling date mode is canceled by deleting the date of departure information D3 and the date of return information D4, for example, the camera 100 can be easily switched to the mode where traveling date information D512 is not stored in the header portion D5.

1-4-2. Playback Process

By manipulating the manipulation section 18 of the camera 100, the user is able to switch to a mode (playback mode) of playing back an image from an image file which is stored in the memory card 30 or the like. The following process is a playback process for an image file in which the traveling date information D512 of FIG. 6A is stored.

Figure 7:
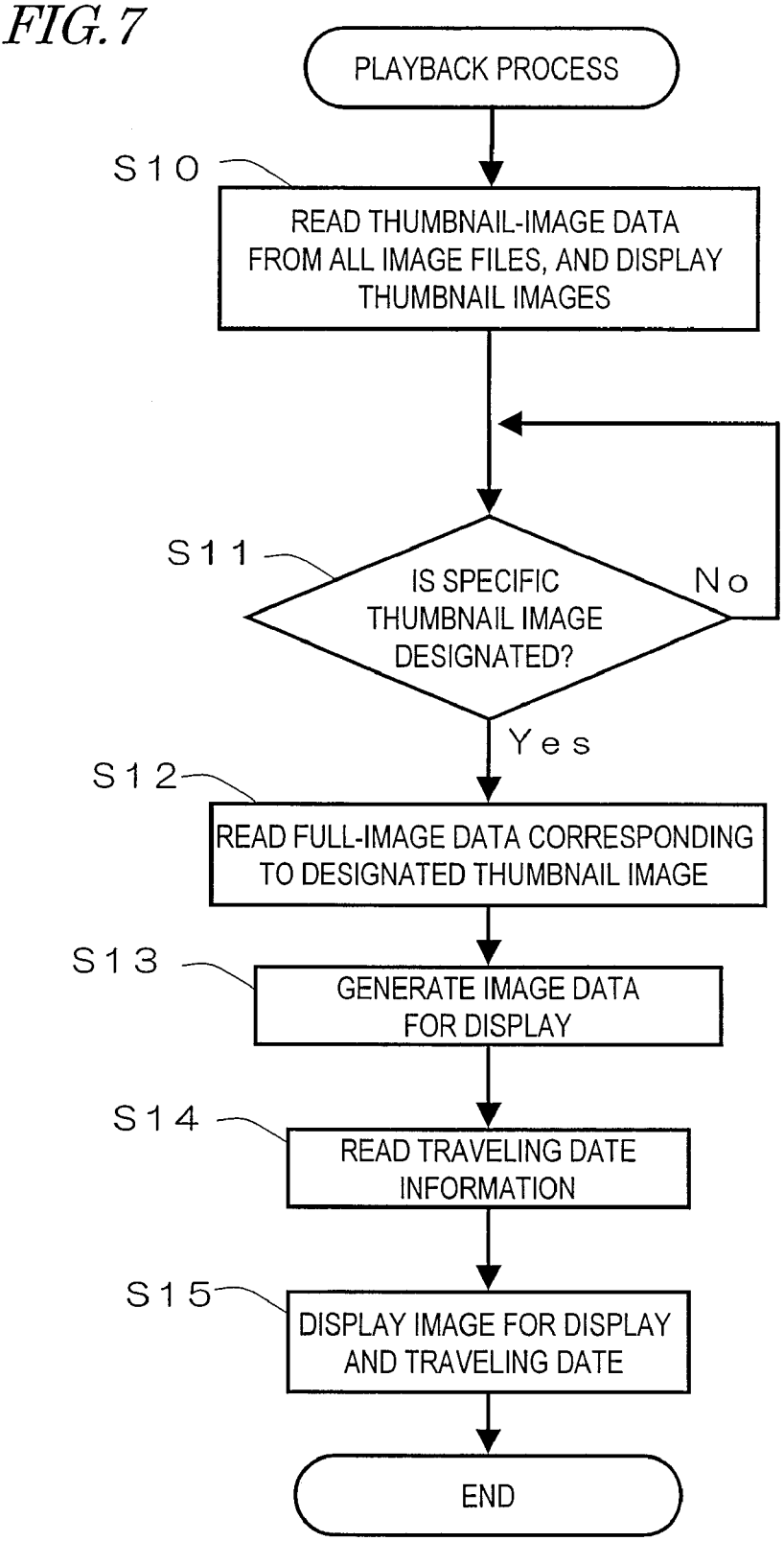
FIG. 7 is a flowchart showing the procedure of a playback process by the camera 100 according to Embodiment 1.

FIG. 7 is a flowchart showing the procedure of a playback process by the camera 100 according to the present embodiment.

In step S10, the controller 16 reads thumbnail-image data D52 from all (or some) of the image files that are stored in the memory card 30, and displays thumbnail images on the display 17.

In step S11, the controller 16 keeps monitoring until a specific thumbnail image is designated by the user. When an image is designated, the process proceeds to step S12.

In step S12, the controller 16 reads full-image data D6 corresponding to the designated thumbnail-image data D52 from the memory card 30. As shown in FIGS. 6A and 6B, in the present embodiment, image data D52 and D6 are stored in a common image file.

Next, in step S13, the controller 16 instructs the image processor 14 to perform predetermined image processing for the full-image data D6 that has been read and generate image data for display.

In step S14, from the image file from which the full-image data D6 has been read, the controller 16 reads the traveling date information D512. Then, in step S15, based on the generated image data for display and the traveling date information D512, an image for display and a traveling date are displayed on the display 17. Specifically, on the display 17, an image for display is displayed together with a traveling date which is superposed on the displayed image through OSD (On Screen Display) processing. FIG. 1 (described earlier) exemplifies a resultant displayed image.

Thus, with respect to any image file whose header portion D5 has traveling date information D512 stored therein, it is possible to display the traveling date information D512, thus making it possible to easily grasp which day during the travel the image was taken.

Although step S10 above illustrates a process in which the camera 100 displays thumbnail images, this is only exemplary. In other processes, instead of displaying a plurality of thumbnail images, the camera 100 may selectively display one full image at time, in forward or backward order. The selective displaying may be performed in response to a user manipulation, or occur at a predetermined time interval.

Note that, even if there is a mixture of image files having traveling date information D512 stored in their header portions D5 and image files not having traveling date information D512 stored in their header portions D5, it is easy to switch the process individually. For example, a step of detecting meaningful traveling date information D512 may be provided between step S13 and step S14, and if no meaningful traveling date information D512 is found to exist, only the image for display may be displayed.

Thus, in accordance with the camera 100 of the present embodiment, by previously setting the date of departure information D3 for a travel, it becomes possible to automatically switch, once the travel begins, to a mode where traveling date information D512 is stored in the header portion D5.

Moreover, in the camera 100, the controller 16 allows a date of return of a travel to be set. When generating an image file (or when the image generating means generates image data), if the current time is after the date of return of the travel, the controller 16 stores shooting date/time information D511 to the header portion, and does not store traveling date information D512.

Thus, by previously setting date of return information D4 for a travel, it becomes possible, after the end of the travel, to automatically return to the original mode where traveling date information D512 is not stored in the header portion D5.

2. Embodiment 2

The present embodiment will illustrate an image capture device which can be used even in the presence of a time difference between a region of departure and a traveled region, as in an overseas travel.

2-1. Construction of the Digital Still Camera

It is assumed that the image capture device of the present embodiment is a digital still camera, having the same exterior appearance and internal structure as those of the digital still camera of Embodiment 1 as shown in FIGS. 2 and 3, respectively. As in Embodiment 1, the digital still camera of the present embodiment will be referred to as a "camera 100".

With the camera 100 of the present embodiment, the user is able to set a time difference between a region of departure and a traveled region, in addition to date of departure information D3 and date of return information D4. The time difference may be input after the date of departure information D3 and date of return information D4 are input.

Figure 8:
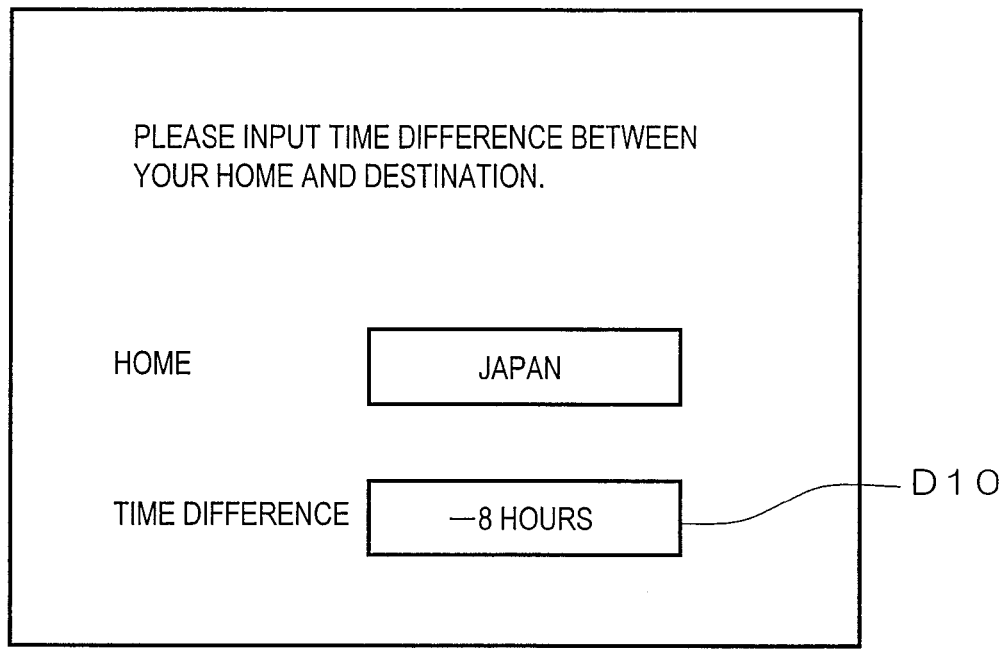
FIG. 8 is a diagram showing an exemplary image that is represented on the display 17 of the camera 100 when a time difference is being set.

FIG. 8 shows an exemplary image that is displayed on the display 17 of the camera 100 when a time difference is being set. While confirming the substance of time difference information D10 which is being input and displayed on the display 17, the user is able to change, finalize, or cancel the substance of such information via the manipulation section 18. For example, before the overseas travel, the user may set his or her own country (point of departure) in a box indicated as "home", set a time difference between his or her own country and the country or region (point of arrival) which is the destination of travel in a box indicated as "time difference", and finalize it. The finalized time difference information D10 is stored in the flash memory 21 (FIG. 3) together with the date of departure information D3 and date of return information D4.

Note that, although FIG. 8 illustrates a case where the time difference information D10 is set as the user inputs a numerical value, this is only exemplary. For example, a world map may be displayed for allowing the user to select a region which is the destination of travel, and the controller 16 may calculate a time difference based on the selected region, which is to be set as the time difference information D10. Alternatively, the camera 100 may utilize its own internal GPS function, or acquire longitude information from an external device having a GPS function, to acquire longitude information after arriving at the destination of travel, and the controller 16 may calculate a time difference based on the longitude information, which is to be set as the time difference information D10.

2-2. Operation of the Digital Still Camera

FIG. 9 is a flowchart showing the procedure of an imaging process by the camera 100 of the present embodiment. Among the steps of FIG. 9, those which are identical to the steps in FIG. 5 will be denoted by like reference numerals, and their descriptions will be omitted. The process of FIG. 9 is to be executed when the user uses the camera 100 on an overseas travel or the like which involves a time difference. It is assumed that time difference information D10 has been set to the camera 100.

Step S20 is executed after image data is generated in step S2.

In step S20, the controller 16 calculates local shooting date/time information. The local shooting date/time information is calculated through an addition of a current time which is specified by the information that is output from the timer 19 and a time difference which is specified by the time difference information D10. For example, if the current time is "Jan. 10, 2007, 15:30" and the time difference is "−8 hours", the local shooting date/time information will be "Jan. 10, 2007, 7:30".

At subsequent steps S4 to S6, against a shooting date which is defined by the date and time that is specified by the resultant local shooting date/time information, it is determined whether the shooting date falls within the traveling period or not. If it falls within the traveling period, traveling date information is generated based on the local shooting date/time information and the date of departure information D3. Note that the timer 19 keeps counts of and outputs the current time at the point of departure. Generally speaking, the traveling period is to be specified based on the date and time at the point of departure.

In step S21 following step S6, the controller 16 generates an image file which contains traveling date information and local shooting date/time information, and ends the process.

Note that setting of the time difference information D10 and setting of the traveling date mode (i.e., setting of the date of departure information D3) pertain to independent manipulations. Even if the time difference information D10 is set, the traveling date mode may not be set, or both of the time difference information D10 and the traveling date mode may be set at a given time.

FIG. 10 schematically shows the data structure of an image file 57 which contains traveling date information D512 and local shooting date/time information D513. Instead of the shooting date/time information D511 shown in FIG. 6A, the local shooting date/time information D513 is stored.

In accordance with the camera of the present embodiment, the user is asked to input information of a date of departure and a date of return of a travel, and if a time difference exists between the point of departure and the point of arrival of the travel, the user is asked to input the time difference, which is stored in the image file. Since the local shooting date/time information D513 is added to the image file, the scene, background, and brightness of the image that has been shot will be harmonious with the local shooting date/time information. This allows the viewer to continue play back of the shot images without awkwardness.

3. Embodiment 3

The present embodiment will illustrate an image processing device which newly generates and adds traveling date information to the header portion of an existing image file which does not have traveling date information (e.g., the image file 56 of FIG. 6B). For example, such an image processing device is implemented as a PC 120 (shown in FIG. 2) which does not have an image capture function. Alternatively, a digital still camera 100 or digital camcorder 110 that has an image capture function may be allowed to have the below-described function. In the following descriptions, it is assumed that the image processing device is a PC 120.

3-1. Construction of the PC

FIG. 11 shows the internal hardware construction of the PC 120. The PC 120 includes a display 121, a manipulation section 122, a controller 123, and a card slot 125. The controller 123 includes a host controller 124 for controlling the communications between the card slot 125 and the memory card 30.

In the case where the PC 120 is a laptop-type PC, for example, the display 121 may be a liquid crystal display, the manipulation section 122 may be a keyboard and a touch pad, and the controller 123 may be a central processing unit (CPU).

3-2. Operation of the PC

Next, a process by the PC 120 will be described.

FIG. 12 is a flowchart showing the procedure of a process by the PC 120 of the present embodiment. This process is executed, based on the user's selection, when the memory card 30 is inserted in the card slot 125, for example.

The image files to be used for this process may be generated by a traditional digital still camera, or by the camera 100 of Embodiment 1 or Embodiment 2 but which lack traveling date information because of failing to set the traveling date mode, for example. For convenience of description, it is assumed that the following process is to be performed for all of the image files that are stored in the memory card 30.

Hereinafter, the image files 56 shown in FIG. 6B will be described as an example. Among the steps of FIG. 12, those which are identical to the steps in FIG. 5 will be denoted by like reference numerals, and their descriptions will be omitted.

In step S30, the controller 123 displays a message on the display 121 to ask the user to input a date of departure and a date of return for a travel which has already taken place. Via the keyboard 122, the user inputs information of the date of departure and the date of return. The information of the date of departure and the information of the date of return that are input correspond to the date of departure information D3 and the date of return information D4 in Embodiment 1, respectively.

In step S31, the controller 123 acquires one image file from the memory card 30 via the card slot 125, and extracts the shooting date/time information D511 from its header portion D5. The shooting date/time information D511 specifies a date (i.e., the shooting date of the image) on which the image data that is stored in the image file was generated.

In steps S4 and S5, the controller 123 compares the shooting date/time information D511 against the date of departure information D3 which has been input by the user, and compares the shooting date/time information D511 against the date of return information D4, thereby determining whether the shooting date falls within the traveling period. If the shooting date falls within the traveling period, the process proceeds to step S6; if the shooting date does not fall within the traveling period, the process proceeds to step S33. If the process proceeds to step S33, no traveling date information will be added to the image file.

In step S6, the controller 123 generates traveling date information by calculating which day from the date of departure the shooting date falls on. Then, at the next step S32, the generated traveling date information is added to the header portion D5 of the image file 56 that has been acquired.

Then, in step S33, the controller 123 determines whether all of the image files in the memory card 30 have been processed or not. If not, the controller 123 again performs the process beginning from step S31, the process being directed to the unprocessed image files. On the other hand, if the process has been completed for all image files, the process is ended.

By executing the process shown in FIG. 12, traveling date information can be added ex post facto to an image file which lacks traveling date information. This makes it possible to apply the playback process shown in FIG. 7 to that image file, thus realizing a file management with ease of viewing. The playback process shown in FIG. 7 is implementable as a computer program, and thus the PC 120 is capable of executing such a playback process.

Although the present embodiment illustrates a case where the shooting date/time information D511 which is stored in the header portion D5 of the image file 56 is utilized, this is only exemplary. Any information that is capable of specifying a time of shooting may be used, instead of shooting date/time information D511. For example, instead of shooting date/time information D511 in the header portion D5, a time stamp of the image file 56 may be utilized as the date/time of shooting.

4. Embodiment 4

Embodiment 3 has illustrated a process of adding newly-generated traveling date information to an existing image file which lacks traveling date information.

The present embodiment illustrates an image processing device which, when playing back an image from an existing image file which does not have traveling date information (e.g., the image file 56 of FIG. 6B), generates traveling date information and outputs a traveling date so as to be superposed on the image. As used herein, outputting of an image and a traveling date encompasses not only displaying them on a display device, but also printing them on paper or the like. Therefore, the image processing device of the present embodiment is implemented as a PC 120, a printer 130, or a TV 140 shown in FIG. 2, for example.

Although the image processing device will be described as a PC 120 below, the following description is similarly applicable to a printer 130 or a TV 140, in which case the display 121 and the manipulation section 122 of the PC 120 will be read as a display 131 and manipulation keys 132 (of the printer 130), or a screen 141 and a remote control 142 (of the TV 140).

The construction of the PC 120 is as shown in FIG. 11. Again, the present embodiment will be described on the basis of the image file 56 of FIG. 6B. It is assumed that the image file 56 has already been generated and stored in the memory card 30.

Hereinafter, the operation of the PC 120 according to the present embodiment will be described with reference to FIG. 13.

Figure 13:
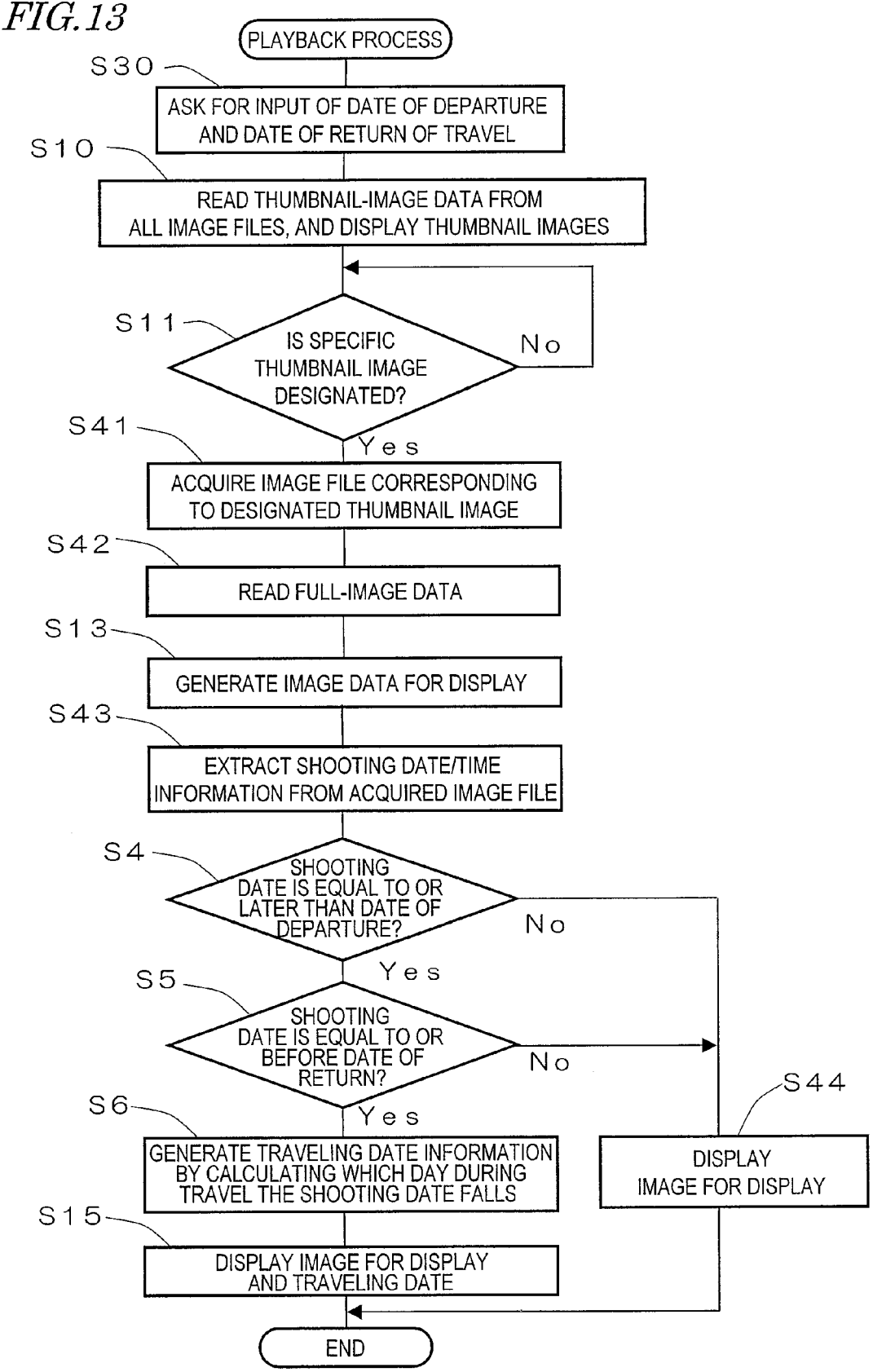
FIG. 13 is a flowchart showing the procedure of a playback process by the PC 120 according to Embodiment 4.

FIG. 13 is a flowchart showing the procedure of a playback process by the PC 120 of the present embodiment.

First, after a date of departure and a date of return of a travel are input by the user in step S30, thumbnail images are displayed on the display 121 based on thumbnail-image data D52 of all of the image files in the memory card 30 in step S10. Then, the controller 123 halts the process until a specific thumbnail image is designated in step S11.

When a specific thumbnail image is designated, the controller 123 acquires an image file 56 corresponding to the designated thumbnail image in step S41, and reads the full-image data D6 from that image file 56 in step S42. Then, data for display is generated from the full-image data D6 in step S13.

In step S43, the controller 123 extracts shooting date/time information D511 from the acquired image file.

Then, if the shooting date falls within the traveling period (following "Yes" from both steps S4 and S5), the process proceeds to step S6, where the controller 123 generates traveling date information. Then, in step S15, the controller 123 displays an image for display and a traveling date on the display 17, based on the generated image data for display and the traveling date information.

On the other hand, if the shooting date does not fall within the traveling period (following "No" from either step S4 or step S5), the controller 123 displays an image for display on the display 17 based on the generated image data for display, in step S44.

Through the above process, even if traveling date information D512 is not stored in the image file, the PC 120 is able to generate traveling date information based on the date of departure information D3 and date of return information D4 which have been input by the user. As a result, an indication as to which day in the traveling period the image was shot can be displayed so as to be superposed on an image that is displayed on the display 17 or on a printed image.

Thus, Embodiments 1 to 4 of the present invention have been described.

The above embodiments assume that the "current time" used for determining whether a shooting date falls within a traveling period or not is a point in time indicated by the information which is output from the timer 19 when the shutter button 5 of the camera 100 is pressed. However, it does not need to be this exact point in time. For example, it may be a point in time at which the controller 16 generates an image file, a point in time at which the image processor 14 generates image data, or a point in time in their neighborhoods. Any such point in time may be stored in the image file as shooting date/time information.

Although the above embodiments illustrate traveling date information D512 as an example, other kinds of information may also be used. For example, it may be information specifying the place (e.g., latitude and longitude) of the destination of travel. Whichever kind of information is used, the information will be treated as a piece of information which is usually not added to the header portion D5 but is added to the header portion D5 during a previously-designated period. Note that the place information of a destination of travel may be input by the user, or specified based on a GPS function internalized in the camera or the like or by using latitude information and longitude information which is acquired from an external device having a GPS function.

The above embodiments assume that the traveling date information D512 is a piece of information indicating the number of days as counted from the beginning of the travel. However, the traveling date information D512 may be a piece of information indicating the number of hours/number of minutes that have elapsed since the travel was started.

According the present invention, the type of information to be stored in the header portion D5 is changed depending on whether the current time is within a period which was set by the user or outside the period. Therefore, the present invention also encompasses an operation such that a give piece of information is stored in the header portion D5 while being outside a period which was set by the user, and that the information is not stored in the header portion D5 during the period.

Although the present embodiment illustrates a case where a memory card is utilized when the image processing device acquires image data from the image capture device, this is only exemplary. Image data can be moved by various methods. For example, the image processing device may acquire image data from the image capture device via a wired/wireless communication line; the image capture device may allow the image file to be stored to another device (e.g., a file server); and the image processing device may access the server or the like to acquire the image file.

In the above-described embodiments, the processing procedures by the respective devices as illustrated in FIGS. 5, 7, 9, 12, and 13 are realized as computer programs. Such processes are realized when the controller 16 or controller 123 (as a CPU) reads and executes such computer programs. Each such computer program is to be distributed on the market as a product in a recorded form on a storage medium such as a CD-ROM, or transmitted via telecommunication lines such as the Internet. Note that the controller 16 or 123 may be implemented in hardware, e.g., a DSP, having a computer program embedded in semiconductor circuitry.

The present invention is applicable to an image capture device and an image processing device which are capable of storing various types of information to a header portion of an image file. More specifically, the present invention is applicable to a digital still camera, a digital camcorder, a mobile phone terminal having a camera function, and the like. Moreover, the present invention is applicable to an image processing device which is capable of reading various types of information stored in a header portion of an image file, and outputting it (by displaying or printing) together with image data.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2007-016014 filed on Jan. 26, 2007 and No. 2008-000666 filed on Jan. 7, 2008, the entire contents of which are hereby incorporated by reference.

What is claimed is:

1. An image capture device comprising:
   an imager for imaging an object and generating image data;
   an image file generator for generating an image file by adding, to the image data generated by the imager, a header portion which stores at least one type of information concerning shooting circumstances;
   a timer for outputting information indicating a current time; and
   a manipulation section operable to set period information defining a period specified by a start time and an end time, prior to the start time,
   wherein the image file generator changes the type of information to be stored in the header portion depending on whether a time of imaging as indicated by the information which is output from the timer at the time of the imaging falls within the period specified by the period information,
   wherein information indicating the start time of the period is set as the period information,
   wherein the image file generator is operable to,
   if the time of imaging is before the start time specified by the period information, store in the header portion first time information indicating a point in time at which the object is imaged, and
   if the time of imaging is equal to or later than the start time specified by the period information, store in the header portion the first time information and second time information indicating an elapsed time from the start time to the time of imaging,
   wherein,
   the timer outputs information of a current time of a first location;
   the manipulation section is used to set a time difference information specifying a time difference between the first location and a second location; and
   based on the information which is output from the timer at the time of the imaging and the time difference information, the image file generator calculates third time information indicating a point in time of the second location at the time of the imaging, and stores the third time information to the header portion in place of the first time information if the point in time of the second location as indicated by the third time information is equal to or later than the start time specified by the period information.

2. The image capture device of claim 1, wherein information specifying the end time of the period is further set as the period information, and
   wherein the image file generator is operable to, if the time of imaging is after the end time specified by the period information, store the first time information to the header portion and not store the second time information to the header portion.

3. The image capture device of claim 1, wherein, if the point in time of the second location as indicated by the third time information is equal to or later than the start time specified by the period information, the image file generator stores the third time information to the header portion as the first time information, and stores fourth time information to the header portion as the second time information, the fourth time information indicating an elapsed time from the start time to the point in time of the second location as indicated by the third time information.

4. A storage medium having a computer program recorded thereon to be executed by an image capture device, the image capture device including:

an imager for imaging an object and generating image data;

an image file generator for generating an image file based on the image data generated by the imager;

a timer for outputting information indicating a current time; and a manipulation section operable to set period information defining a period specified by a start time and an end time, prior to the start time, wherein the computer program causes the image file generator to execute:

a process of determining whether a time of imaging as indicated by the information which is output from the timer at the time of the imaging falls within the period specified by the period information;

a process of generating a header portion which stores at least one type of information concerning shooting circumstances, where the type of information to be stored is changed depending on a result of the determination; and a process of generating an image file by adding the header portion to the image data, wherein information indicating the start time of the period is set as the period information, wherein the image file generator is caused to, if the time of imaging is before the start time specified by the period information, store in the header portion first time information indicating a point in time at which the object is imaged, and if the time of imaging is equal to or later than the start time specified by the period information, store in the header portion the first time information and second time information indicating an elapsed time from the start time to the time of imaging, wherein, the timer outputs information of a current time of a first location;

the manipulation section is used to set a time difference information specifying a time difference between the first location and a second location; and based on the information which is output from the timer at the time of the imaging and the time difference information, the image file generator calculates third time information indicating a point in time of the second location at the time of the imaging, and stores the third time information to the header portion in place of the first time information if the point in time of the second location as indicated by the third time information is equal to or later than the start time specified by the period information.

* * * * *